United States Patent
Osaka et al.

(10) Patent No.: US 12,413,861 B2
(45) Date of Patent: Sep. 9, 2025

(54) OPTICAL ACTUATOR, CAMERA MODULE, AND CAMERA-MOUNTED DEVICE

(71) Applicants: Tomohiko Osaka, Tokyo (JP); Yohei Enta, Tokyo (JP)

(72) Inventors: Tomohiko Osaka, Tokyo (JP); Yohei Enta, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/254,609

(22) PCT Filed: Nov. 29, 2021

(86) PCT No.: PCT/JP2021/043624
§ 371 (c)(1),
(2) Date: Oct. 3, 2023

(87) PCT Pub. No.: WO2022/114181
PCT Pub. Date: Jun. 2, 2022

(65) Prior Publication Data
US 2024/0406559 A1    Dec. 5, 2024

Related U.S. Application Data

(60) Provisional application No. 63/119,001, filed on Nov. 30, 2020.

(51) Int. Cl.
*H04N 23/68* (2023.01)
*H04N 23/54* (2023.01)
*H04N 23/55* (2023.01)

(52) U.S. Cl.
CPC .......... *H04N 23/686* (2023.01); *H04N 23/54* (2023.01); *H04N 23/55* (2023.01)

(58) Field of Classification Search
CPC ........ G03B 19/12; H02N 2/001; H02N 2/026; H02N 2/103
See application file for complete search history.

(56) References Cited

U.S. PATENT DOCUMENTS

| 6,092,431 A | * | 7/2000 | Okamoto | ............... H02N 2/101 359/823 |
| 2007/0164635 A1 | * | 7/2007 | Witteveen | .............. G02B 7/005 310/323.01 |

(Continued)

FOREIGN PATENT DOCUMENTS

JP     2015-092285 A    5/2015

OTHER PUBLICATIONS

International Search Report from International Application No. PCT/JP2021/043624, mailed date Feb. 1, 2022.

*Primary Examiner* — Noam Reisner
(74) *Attorney, Agent, or Firm* — Shih IP Law Group, PLLC.

(57) ABSTRACT

An optical actuator that comprises an inside holder that can hold an optical path bending member, an outside holder supporting the inside holder such that the inside holder can pivot around a first axis, and a drive unit making the inside holder pivot. Either end part of the inside holder is rotatably supported on the outside holder. The drive unit has: an ultrasonic motor supported on the outside holder, and an intermediate part supported on the inside holder. The ultrasonic motor has an oscillator that resonates, and the intermediate part has a fan-shaped contact part that contacts the oscillator.

7 Claims, 10 Drawing Sheets

(56) References Cited

U.S. PATENT DOCUMENTS

2017/0052386 A1\* 2/2017 Siegrist ................. H02K 41/02
2021/0208415 A1\* 7/2021 Goldenberg ........... H04N 23/55

\* cited by examiner

OPTICAL ACTUATOR, CAMERA MODULE, AND CAMERA-MOUNTED DEVICE

TECHNICAL FIELD

The present invention relates to an optical actuator, a camera module, and a camera-mounted device.

BACKGROUND ART

In the related art, a thin camera-mounted device in which a camera module is mounted, such as a smartphone and a digital camera, has been known. The camera module includes: a lens part including one or more lenses; and an image-capturing element that captures a subject image formed by the lens part.

Further, a camera module including a bending optical system, in which light from a subject along a first optical axis is bent in a direction of a second optical axis through a prism, which is an optical path bending member, provided at a stage prior to a lens part and is guided to the lens part at a stage subsequent to the prism, has also been proposed (for example, Patent Literature (hereinafter, referred to as "PTL") 1).

The camera module disclosed in PTL 1 includes: a shake-correcting device that corrects camera shake generated in a camera; and an auto-focusing device that performs auto-focusing. Such a camera module includes a shake-correcting actuator and an auto-focusing actuator as optical actuators.

Of these actuators, the shake-correcting actuator includes a first actuator and a second actuator that sway the prism about two different axes. Specifically, the first actuator sways the prism about a swaying axis orthogonal to a plane including a first optical axis and a second optical axis. Further, the second actuator sways the prism about a swaying axis that coincides with the second optical axis.

When camera shake is generated in the camera, the shake-correcting actuator sways the prism under the control of a control unit to perform shake correction. Thus, the camera shake generated in the camera is corrected.

CITATION LIST

Patent Literature

PTL 1
  Japanese Patent Application Laid-Open No. 2015-092285

SUMMARY OF INVENTION

Technical Problem

For the camera module as described above, an optical actuator having a novel configuration is desired.

An object of the present invention is to provide an optical actuator, a camera module, and a camera-mounted device each having a novel configuration.

Solution to Problem

One aspect of an optical actuator according to the present invention includes: an inner holder capable of holding an optical path bending member; an outer holder configured to support the inner holder in a swayable manner about a first axis; and a drive unit configured to sway the inner holder. The inner holder is rotatably supported through a bearing part with respect to the outer holder at both end portions of the inner holder in a direction parallel to the first axis. The drive unit includes an ultrasonic motor, which is supported by the outer holder, and an interposition part, which is supported by the inner holder. The ultrasonic motor includes a transducer configured to resonate. The interposition part includes a contact part configured to come into contact with the transducer and having a fan shape.

One aspect of a camera module according to the present invention includes: the optical actuator described above; an optical path bending member held by an inner holder of the optical actuator and configured to bend incident light travelling along a first direction in a second direction orthogonal to the first direction; and an image-capturing element disposed on a side in the second direction from the optical actuator.

One aspect of a camera-mounted device according to the present invention includes: the camera module described above; and a control unit that controls the camera module.

Advantageous Effects of Invention

According to the present invention, it is possible to provide an optical actuator, a camera module, and a camera-mounted device each having a novel configuration.

DESCRIPTION OF EMBODIMENTS

Hereinafter, an embodiment according to the present invention will be described in detail with reference to the accompanying drawings. Note that, an optical actuator, a camera module, and a camera-mounted device according to an embodiment to be described later are examples of the optical actuator, the camera module, and the camera-mounted device according to the present invention, and the present invention is not limited by the embodiment.

Embodiment

A camera module according to an embodiment of the present invention will be described with reference to FIGS. 1 to 10. Hereinafter, an outline of camera module C will be described and then the structures of optical path bending module 2, lens module 10, and image-capturing element module 11 that are included in camera module C will be described. Note that, the camera actuator, the camera module, and the camera-mounted device according to the present invention may include all configurations to be described later or may not include some of the configurations.

<Camera Module>

Figure 11A:
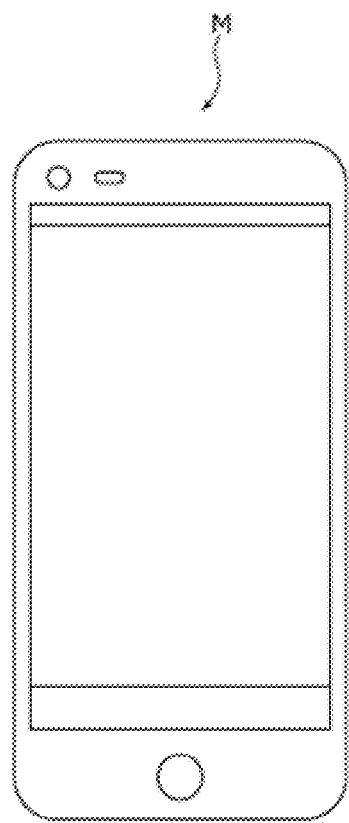
FIG. 11A illustrates an example of a camera-mounted device in which the camera module is mounted.
Figure 11B:
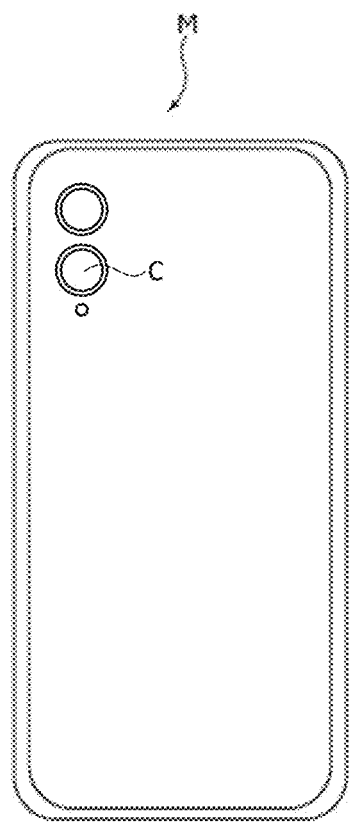
FIG. 11B illustrates an example of the camera-mounted device in which the camera module is mounted.

Camera module C is mounted in, for example, smartphone M (see FIGS. 11A and 11B), a mobile phone, a digital camera, a notebook computer, a tablet terminal, a portable game machine, and a thin camera-mounted device (such as an in-vehicle camera).

Hereinafter, each component that forms camera module C of the present embodiment will be described based on a state in which each component is incorporated in camera module C. Further, in the description of the structure of camera module C of the present embodiment, an orthogonal coordinate system (X, Y, Z) indicated in each drawing is used.

Camera module C is mounted such that the X direction is the left-right direction, the Y direction is the up-down direction, and the Z direction is the front-rear direction as viewed from the photographer, for example, in a case where the camera-mounted device is configured to take a photograph in practice. Light (incident light) from a subject enters mirror MR of optical path bending module 2 from the + side (plus side) in the Z direction as indicated by long dashed short dashed line α (also referred to as a first optical axis) in FIG. 1. Mirror MR corresponds to an example of the optical path bending member. Note that, the optical path bending member may be, for example, a prism.

Figure 1:
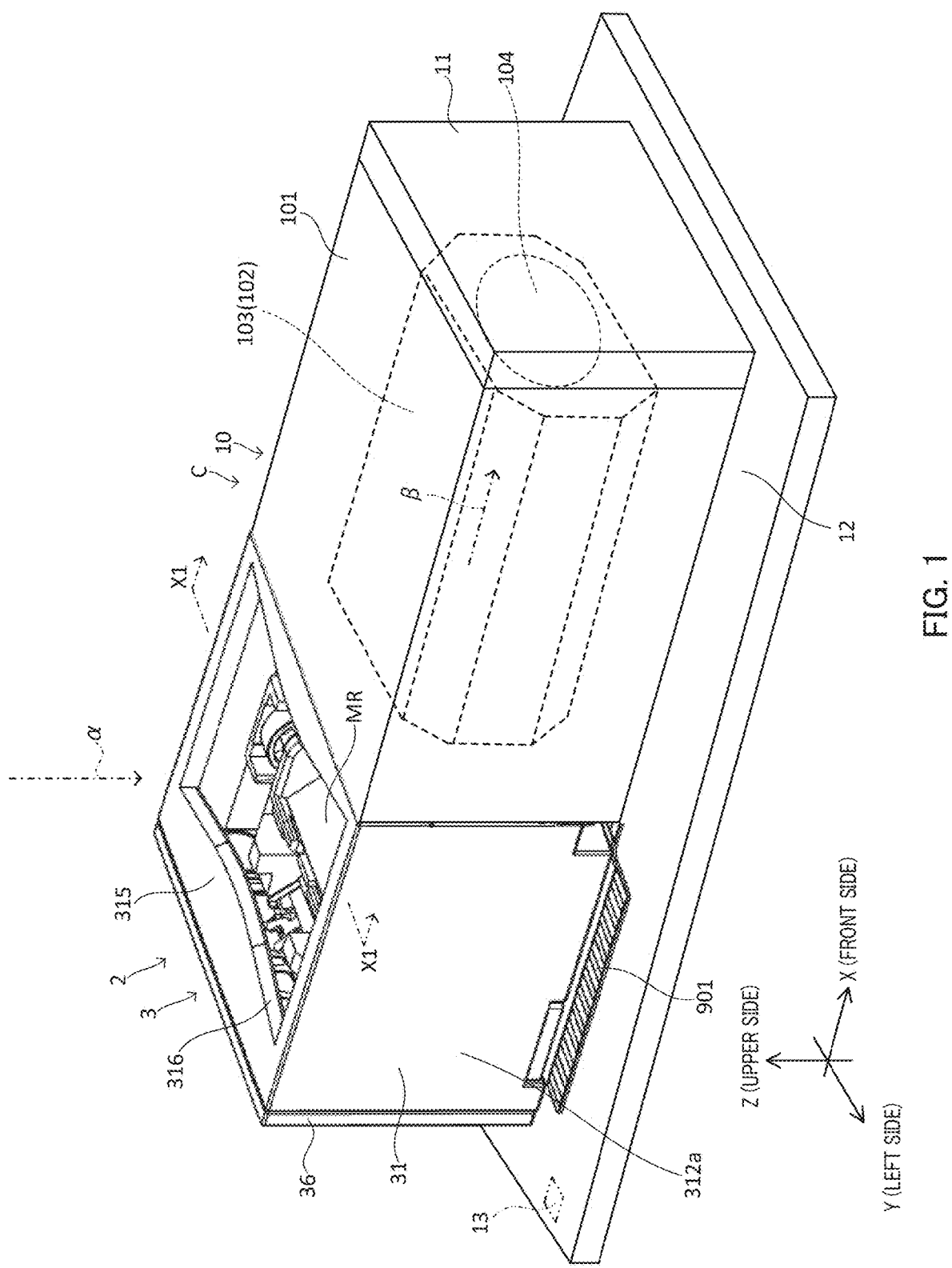
FIG. 1 is a perspective view of a camera module according to an embodiment of the present invention.

The light (emission light) that has entered mirror MR is bent at an optical path bending surface of mirror MR as indicated by long dashed short dashed line β (also referred to as a second optical axis) in FIG. 1 and is guided to lens part 102 of lens module 10 disposed on the + side of mirror MR in the X direction.

Then a subject image formed by lens part 102 is captured by image-capturing element module 11 (see FIG. 1) disposed on the + side of lens module 10 in the X direction.

In the present embodiment, the direction from the + side in the Z direction to the − side (minus side) in the Z direction corresponds to an example of the first direction. Further, the direction from the − side in the X direction to the + side in the X direction corresponds to an example of the second direction. Nonetheless, the first direction and the second direction are not limited to those in the present embodiment. The first direction and the second direction may be directions orthogonal to each other.

Camera module C of the present embodiment causes mirror swaying device S incorporated in optical path bending module 2 to sway mirror MR.

Further, camera module C of the present embodiment performs auto-focusing by displacing the lens part in the X direction with an AF device (not illustrated) incorporated in lens module 10. That is, lens module 10 has an auto-focusing function.

Further, lens part 102 of lens module 10 is a so-called zoom lens that can cope with wide-angle photographing (focal length: short) through telephotographing (focal length: long). Camera module C of the present embodiment moves lens part 102 to a position in the X direction in accordance with the wide-angle photographing or the telephotographing with a zoom device (not illustrated) incorporated in lens module 10. That is, lens module 10 has a zoom function.

(Optical Path Bending Module)

Hereinafter, optical path bending module 2 will be described. Optical path bending module 2 includes base 3, mirror MR, and mirror swaying device S.

(Base)

Figure 2:
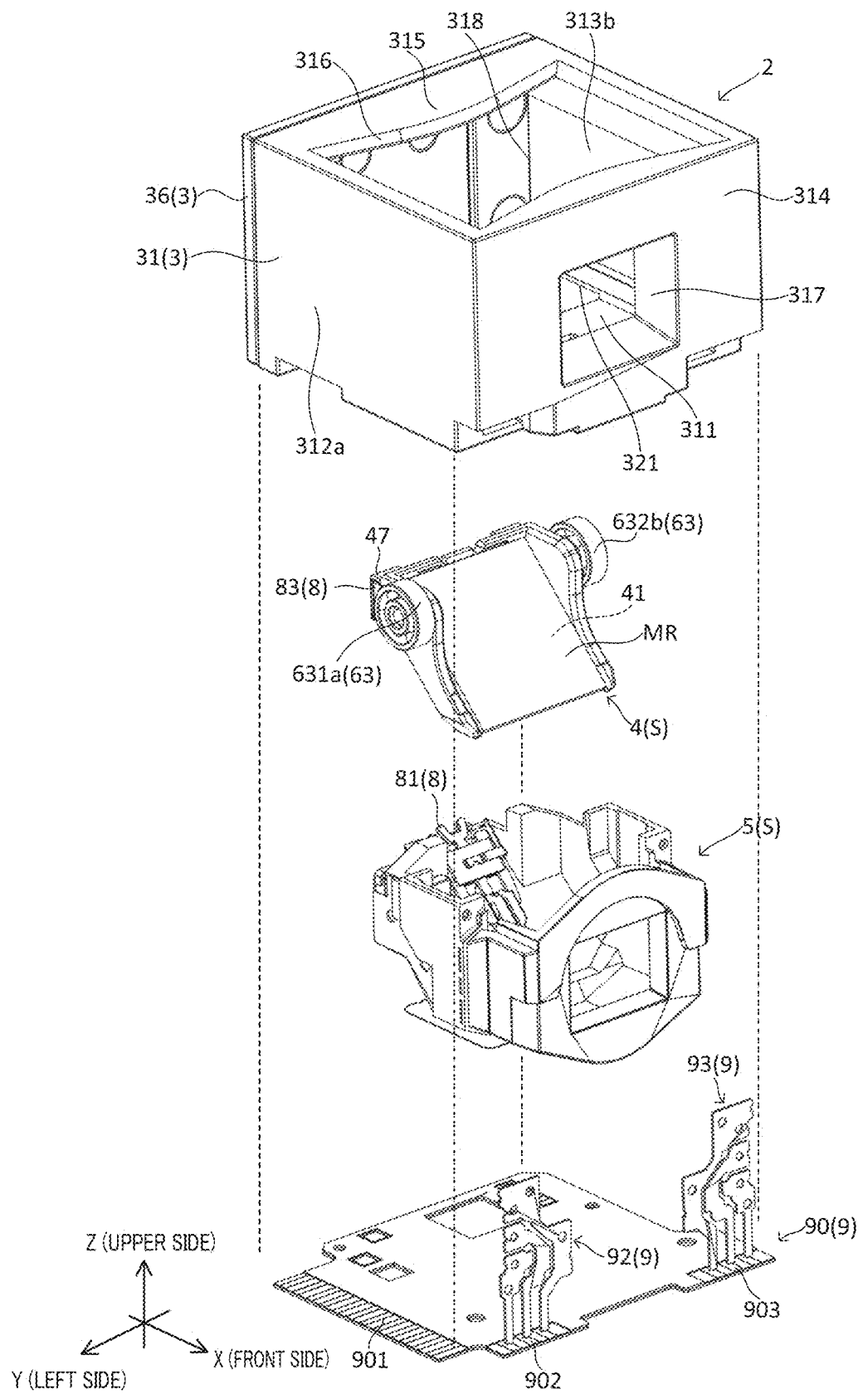
FIG. 2 is an exploded perspective view of an optical path bending module.
Figure 3:
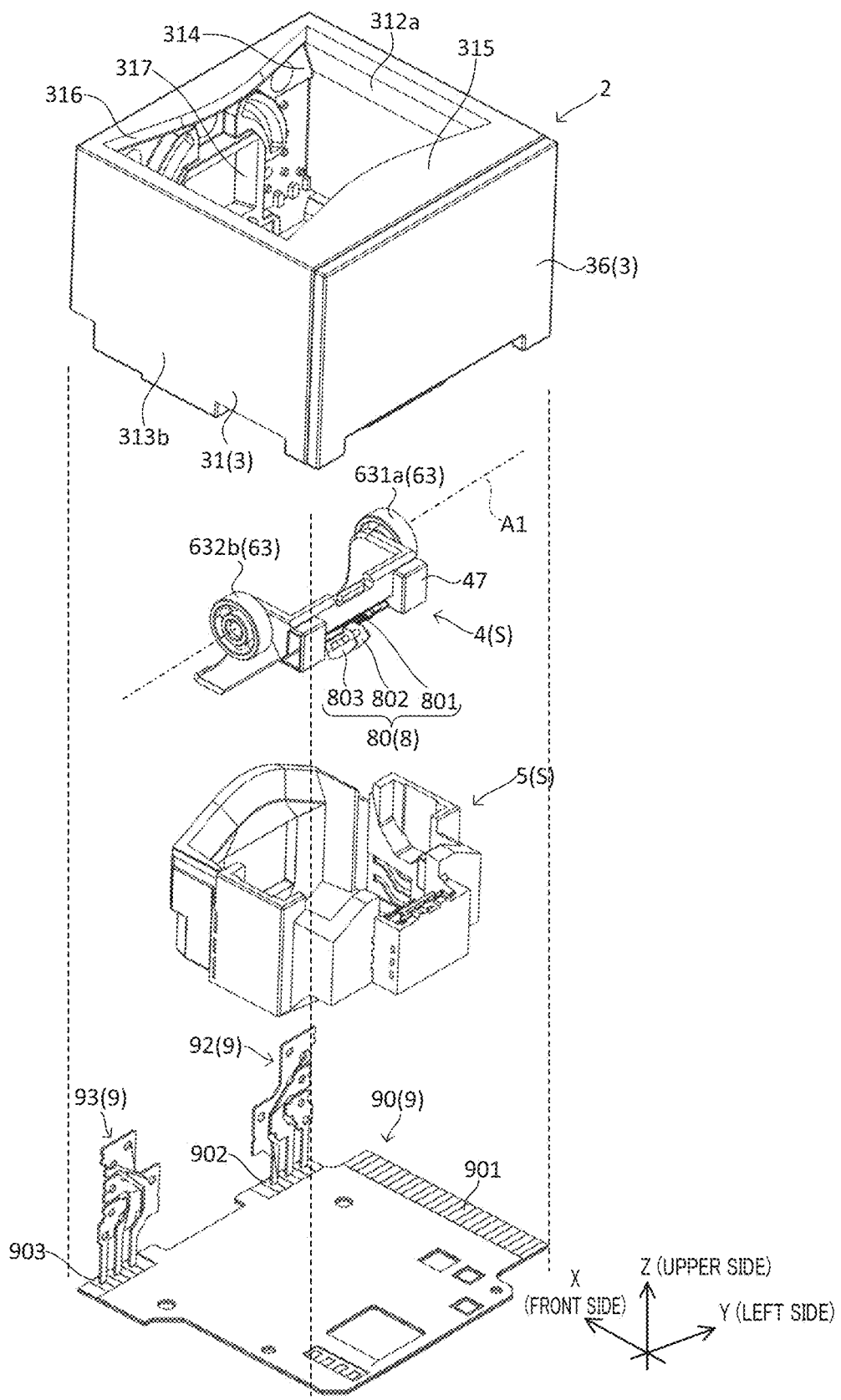
FIG. 3 is an exploded perspective view of the optical path bending module.

Base 3 will be described with reference to FIGS. 1 to 3. Base 3 corresponds to an example of a fixed-side member. Base 3 includes base main body 31, and rear-side plate 36.

(Base Main Body)

Base main body 31 is made of, for example, synthetic resin or nonmagnetic metal. Base main body 31 is a box-shaped member that is partially open. Light from a subject can pass through an opening part (upper-side opening part 316) of base main body 31 on the + side in the Z direction to penetrate an interior space of the base. Base 3 as described above is configured to accommodate mirror swaying device S to be described later.

Specifically, base main body 31 includes lower-side wall part 311, left-side wall part 312a, right-side wall part 313b, front-side wall part 314, and upper-side wall part 315. Further, base main body 31 includes upper-side opening part 316, front-side opening part 317, rear-side opening part 318, and lower-side opening part 321.

(Lower-Side Wall Part)

Lower-side wall part 311 has a rectangular plate shape parallel to the XY plane. Lower-side wall part 311 forms a bottom part of base main body 31. Note that, hereinafter, the left-right direction means the left-right direction in a case where optical path bending module 2 is viewed from the + side in the X direction with the + side in the Z direction facing upward. Accordingly, the + side in the Y direction corresponds to the left side, and the − side in the Y direction corresponds to the right side. Further, in optical path bending module 2, the + side in the X direction corresponds to the front side, and the − side in the X direction corresponds to the rear side. In addition, in optical path bending module 2, the + side in the Z direction corresponds to the upper side, and the − side in the Z direction corresponds to the lower side.

(Left-Side Wall Part)

Left-side wall part 312a has a plate shape that is a rectangular plate shape parallel to the XZ plane. Left-side wall part 312a extends to the + side in the Z direction (the upper side) from a left end portion of lower-side wall part 311. The left-side wall part 312a includes a lower end portion connected to the left end portion of lower-side wall part 311.

(Right-Side Wall Part)

Right-side wall part 313b has a plate shape that is a rectangular plate shape parallel to the XZ plane. Right-side wall part 313b extends to the + side in the Z direction (the upper side) from a right end portion of lower-side wall part 311. Right-side wall part 313b includes a lower end portion connected to the right end portion of lower-side wall part 311.

(Front-Side Wall Part)

Front-side wall part 314 has a rectangular plate shape parallel to the YZ plane. Front-side wall part 314 includes a left end portion connected to a front end portion of left-side wall part 312a. Front-side wall part 314 includes a right end portion connected to a front end portion of right-side wall part 313b. Further, front-side wall part 314 includes a lower end portion connected to a front end portion of lower-side wall part 311. Front-side wall part 314 includes an upper end portion connected to a front end portion of upper-side wall part 315 to be described later.

Figure 4:
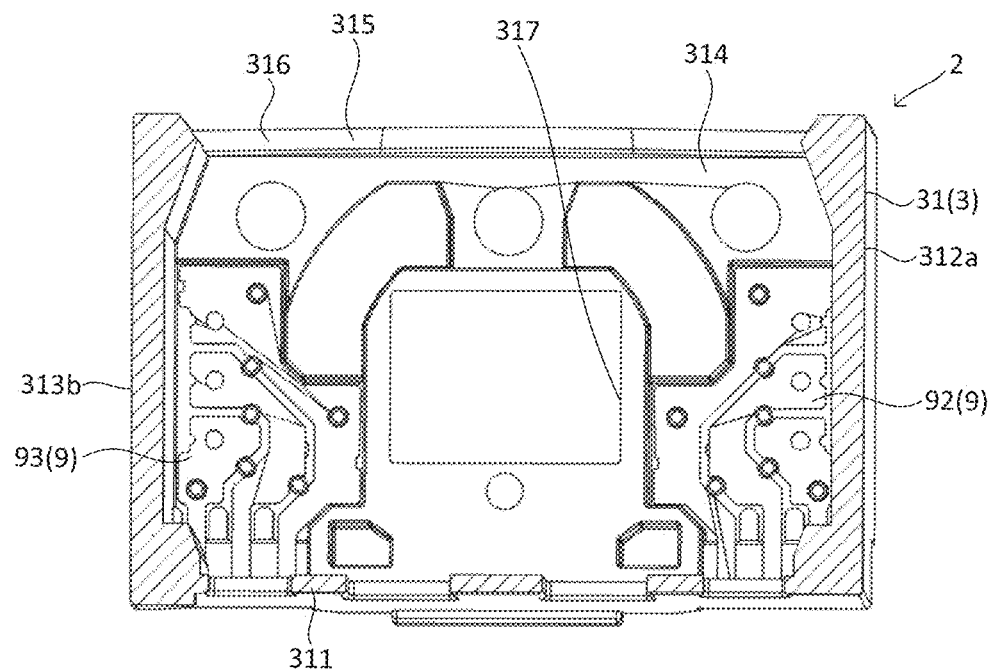
FIG. 4 is a cross-sectional view of a base main body taken along line X1-X1 in FIG. 1.
Figure 4:
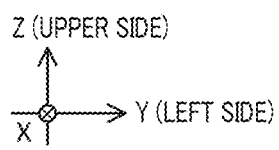
Figure 5:
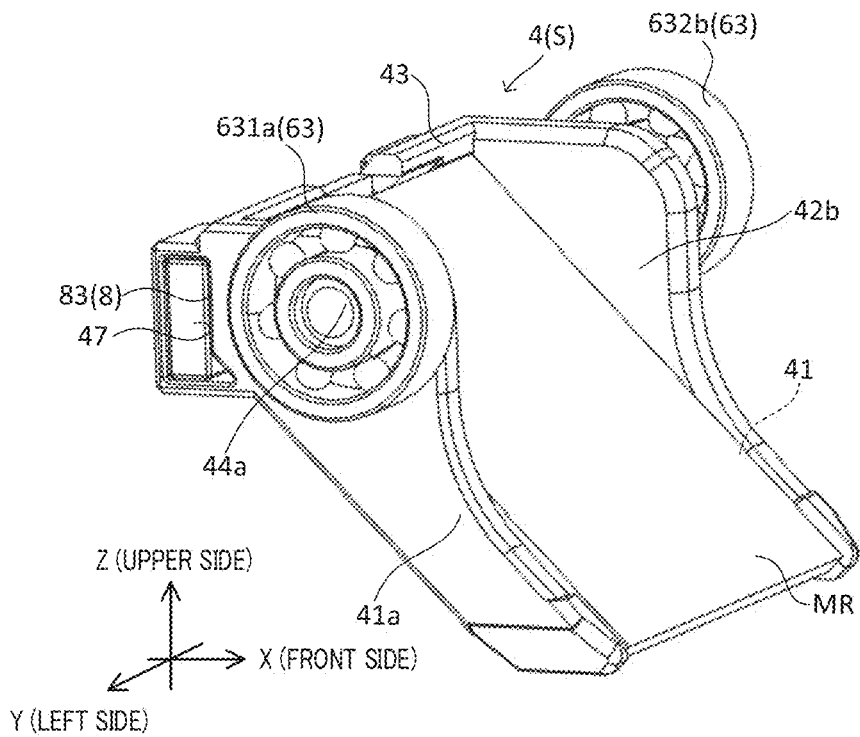
FIG. 5 is a perspective view of an inner holder and members assembled to the inner holder.
Figure 6:
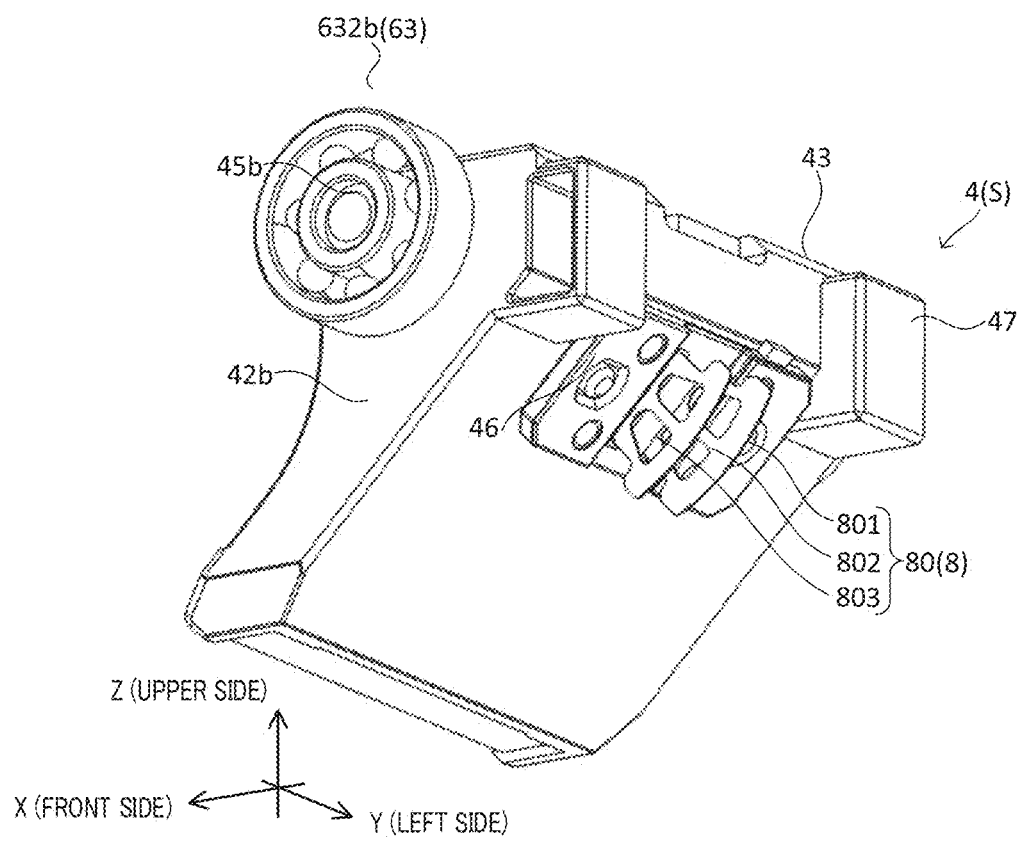
FIG. 6 is a perspective view of the inner holder and the members assembled to the inner holder.
Figure 7:
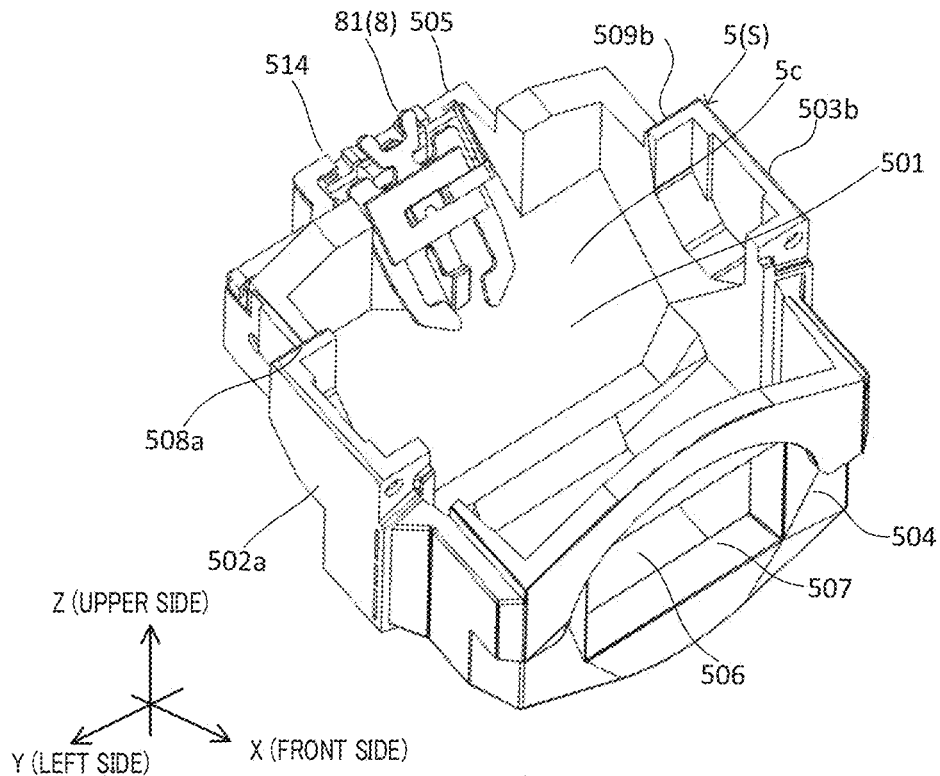
FIG. 7 is a perspective view of an outer holder and members assembled to the outer holder.
Figure 8:
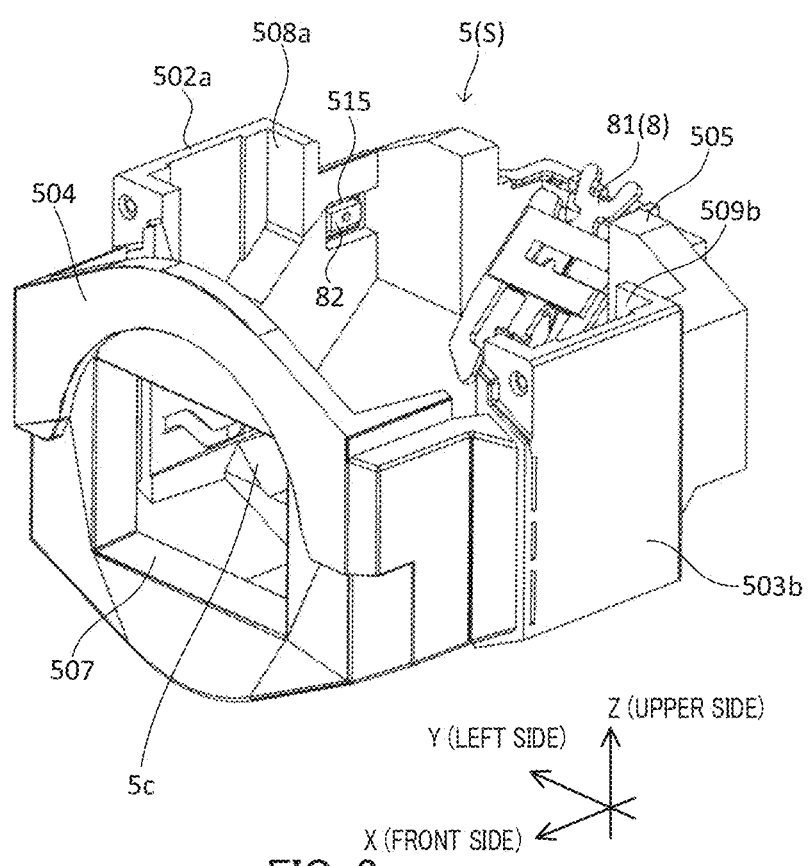
FIG. 8 is a perspective view of the outer holder and the members assembled to the outer holder.

As illustrated in FIG. 4, left-side power supply terminal part 92 and right-side power supply terminal part 93 in power supply part 9 to be described later are fixed to a rear-side surface of front-side wall part 314.

(Upper-Side Wall Part)

Upper-side wall part 315 has a rectangular plate shape parallel to the XY plane. Upper-side wall part 315 is provided on an upper side of lower-side wall part 311 and faces lower-side wall part 311 with a predetermined gap therebetween in the up-down direction (the Z direction).

Upper-side wall part 315 includes a left end portion connected to an upper end portion of left-side wall part 312a. Upper-side wall part 315 includes a right end portion connected to an upper end portion of right-side wall part 313b. Upper-side wall part 315 includes a front end portion connected to an upper end portion of front-side wall part 314.

(Upper-Side Opening Part)

Upper-side opening part 316 is provided at a position including a center portion of upper-side wall part 315. Upper-side opening part 316 is formed of a through-hole having a substantially rectangular shape which penetrates upper-side wall part 315 in the up-down direction (the Z direction). Incident light passes through upper-side opening part 316 and enters optical path bending module 2.

(Front-Side Opening Part)

Front-side opening part 317 is provided at a position including a center portion of front-side wall part 314. Front-side opening part 317 is formed of a through-hole having a rectangular shape which penetrates front-side wall part 314 in the X direction (the front-rear direction). Incident light bent by mirror MR passes through front-side opening part 317 and enters lens module 10.

(Rear-Side Opening Part)

Rear-side opening part 318 is provided in a rear end portion of base main body 31. Specifically, rear-side opening part 318 is an opening part having a rectangular shape defined by a rear end portion of left-side wall part 312a, a rear end portion of right-side wall part 313b, a rear end portion of upper-side wall part 315, and a rear end portion of power supply part 9 (specifically, FPC 90) to be described later. Rear-side opening part 318 is covered by rear-side plate 36.

(Rear-Side Plate)

Rear-side plate 36 has a plate shape parallel to the YZ plane. Rear-side plate 36 covers rear-side opening part 318 from the rear. Rear-side plate 36 is fixed to the rear end portion of left-side wall part 312a, the rear end portion of right-side wall part 313b, and the rear end portion of upper-side wall part 315 by a fixing means such as adhesion.

<Mirror Swaying Device>

Next, mirror swaying device S will be described. Mirror swaying device S sways mirror MR about first axis A1 (see FIG. 3) parallel to the Y direction. Mirror swaying device S as such is disposed in an accommodation space included in base 3.

Mirror swaying device S includes inner holder 4, outer holder 5, sway support part 63, drive unit 8, and power supply part 9.

In mirror swaying device S, inner holder 4 is configured to support mirror MR. Inner holder 4 is supported by base 3 through outer holder 5.

Outer holder 5 supports inner holder 4 through sway support part 63. Inner holder 4 is swayable about first axis A1 with respect to outer holder 5.

When drive unit 8 is driven under the control of control unit 13 (see FIG. 1), inner holder 4 sways about first axis A1 with respect to outer holder 5. Since outer holder 5 is supported by base 3 by means of a support mechanism (not illustrated), inner holder 4 sways about first axis A1 with respect to base 3. Then, mirror MR supported by inner holder 4 also sways about first axis A1 with respect to base 3. Hereinafter, specific structures of the respective members included in mirror swaying device S will be described.

(Inner Holder)

Inner holder 4 will be described with reference to FIGS. 2, 3, 5 and 6. Inner holder 4 corresponds to an example of a movable-side member and holds mirror MR.

Inner holder 4 includes mount part 41, left-side plate part 41a, right-side plate part 42b, and rear-side plate part 43. Further, inner holder 4 includes left-side shaft part 44a, right-side shaft part 45b, inner fixing part 46, and magnet disposing part 47. Inner holder 4 has a symmetrical shape.

(Mount Part)

Mount part 41 has a rectangular plate shape. Mount part 41 is inclined so as to be located downward (the − side in the Z direction) from a rear end portion thereof (the end portion thereof on the − side in the X direction) towards a front end portion thereof (the end portion thereof on the + side in the X direction). Accordingly, the front end portion of mount part 41 is located downward from the rear end portion of mount part 41. An upper surface of mount part 41 is a mounting surface configured to dispose mirror MR. In the case of the present embodiment, the inclination direction of mount part 41 is parallel to a direction of a tangent to a circle around first axis A1.

(Left-Side Plate Part)

Left-side plate part 41a has a plate shape parallel to the XZ plane. Left-side plate part 41a extends upward from a left end portion of mount part 41.

(Right-Side Plate Part)

Right-side plate part 42b has a plate shape parallel to the XZ plane. Right-side plate part 42b extends upward from a right end portion of mount part 41.

(Rear-Side Plate Part)

Rear-side plate part 43 has a plate shape parallel to the YZ plane in a state in which inner holder 4 does not sway. Rear-side plate part 43 includes a left end portion connected to a rear end portion of left-side plate part 41a (the end portion thereof on the − side in the X direction). Rear-side plate part 43 includes a right end portion connected to a rear end portion of right-side plate part 42b. Rear-side plate part 43 includes a lower end portion connected to the rear end portion of mount part 41.

(Left-Side Shaft Part)

Left-side shaft part 44a is configured to support an inner ring of left-side bearing 631a in sway support part 63 to be described later. Left-side shaft part 44a is provided in an outer surface of left-side plate part 41a (the side surface thereof on the + side in the Y direction). Left-side shaft part 44a extends from the outer surface of left-side plate part 41a to the left side (the + side in the Y direction).

(Right-Side Shaft Part)

Right-side shaft part 45b is configured to support an inner ring of right-side bearing 632b in sway support part 63 to be described later. Right-side shaft part 45b is provided in an outer surface of right-side plate part 42*b* (the side surface thereof on the − side in the Y direction). Right-side shaft part 45*b* extends from the outer surface of right-side plate part 42*b* to the right side (the − side in the Y direction). The center axis of left-side shaft part 44*a* and the center axis of right-side shaft part 45*b* are located on the same straight line. The center axis of left-side shaft part 44*a* and the center axis of right-side shaft part 45*b* coincide with first axis A1.

In the case of the present embodiment, a configuration in which left-side bearing 631*a* and right-side bearing 632*b* in sway support part 63 to be described later are supported by left-side shaft part 44*a* and right-side shaft part 45*b* is employed, and thus, inner holder 4 can sway about first axis A1 with high accuracy and stably.

(Inner Fixing Part)

Inner fixing part 46 is a portion to which interposition part 80 of drive unit 8 to be described later is fixed. Inner fixing part 46 is provided in a lower surface of mount part 41. Inner fixing part 46 is provided at a position, which allows interposition part 80 to be fixed, in a center portion of the lower surface of mount part 41 in the Y direction.

(Magnet Disposing Part)

Magnet disposing part 47 is configured to dispose magnet 83 of drive unit 8 to be described later therein. Magnet disposing part 47 is provided in a left end portion of a rear-side surface of rear-side plate part 43. Magnet disposing part 47 is formed of a recessed portion of which the + side in the Y direction is open. By employing the configuration of magnet disposing part 47 as such, inner holder 4 can securely hold magnet 83 of drive unit 8. As a result, it is possible to suppress magnet 83 of drive unit 8 falling off inner holder 4 in a case where inner holder 4 sways.

Note that, in the case of the present embodiment, a simulated magnet disposing part configured in the same manner as magnet disposing part 47 is provided in a right end portion of the rear-side surface of rear-side plate part 43. This simulated magnet disposing part is configured to cause inner holder 4 to have a symmetrical shape. No magnet is disposed in the simulated magnet disposing part. Nonetheless, a simulated magnet having the same weight as magnet 83 may be disposed in the simulated magnet disposing part. When a configuration in which such a simulated magnet is disposed is employed, the weight balance of inner holder 4 in the left-right direction becomes better.

(Outer Holder)

Outer holder 5 will be described with reference to FIGS. 2, 3 and 7 to 9. Outer holder 5 corresponds to an example of the fixed-side member and supports inner holder 4 in a swayable manner about first axis A1 through sway support part 63 to be described later.

Outer holder 5 has a box shape opening upward (on the + side in the Z direction). Outer holder 5 includes accommodation space 5*c* configured to accommodate inner holder 4.

In the case of the present embodiment, outer holder 5 is supported by base 3 by means of the support mechanism (not illustrated) in a state in which outer holder 5 cannot be displaced with respect to base 3. Nonetheless, outer holder 5 may be supported by base 3 by means of the support mechanism (not illustrated) in a state in which outer holder 5 can be displaced with respect to base 3. In this case, outer holder 5 may be supported by base 3 by means of the support mechanism in a state in which outer holder 5 can sway about an axis parallel to the X-axis or the Z-axis. In a case where outer holder 5 is displaced with respect to base 3, outer holder 5 corresponds to an example of the movable-side member.

Outer holder 5 includes inclined plate part 501, left-side plate part 502*a*, right-side plate part 503*b*, front-side plate part 504, rear-side plate part 505, and lower-side plate part 506. Further, outer holder 5 includes front-side opening part 507, left-side bearing holding part 508*a*, right-side bearing holding part 509*b*, fixing part 514, and element disposing part 515.

(Inclined Plate Part)

Inclined plate part 501 has a plate shape and covers accommodation space 5*c* from below. Inclined plate part 501 is inclined so as to be located downward (the − side in the Z direction) from a rear end portion thereof to a front end portion thereof. Accordingly, the front end portion of inclined plate part 501 is located downward from the rear end portion of the inclined plate part 501.

Inclined plate part 501 as such is provided downward from mount part 41 of inner holder 4. The inclination angle of inclined plate part 501 with respect to the X direction is the same as the inclination angle of mount part 41 with respect to the X direction. In other words, an upper surface of inclined plate part 501 is parallel to the lower surface of mount part 41. The upper surface of inclined plate part 501 faces the lower surface of mount part 41 with a predetermined gap therebetween in the up-down direction. A space configured to dispose drive unit 8 to be described later is provided between the upper surface of inclined plate part 501 and the lower surface of mount part 41.

(Left-Side Plate Part)

Left-side plate part 502*a* has a plate shape parallel to the XZ plane and covers accommodation space 5*c* from the left side (the + side in the Y direction). A portion of left-side plate part 502*a* is connected to a left end portion of inclined plate part 501. Left-side plate part 502*a* is located on the left side of left-side plate part 41*a* of inner holder 4 (on the + side thereof in the Y direction). Left-side plate part 502*a* faces left-side plate part 41*a* of inner holder 4 in the left-right direction (the Y direction).

(Right-Side Plate Part)

Right-side plate part 503*b* has a plate shape parallel to the XZ plane and covers accommodation space 5*c* from the right side (the − side in the Y direction). A portion of right-side plate part 503*b* is connected to a right end portion of inclined plate part 501. Right-side plate part 503*b* faces left-side plate part 502*a* with a predetermined gap therebetween in the Y direction. Right-side plate part 503*b* is located on the right side of right-side plate part 42*b* of inner holder 4 (on the − side thereof in the Y direction). Right-side plate part 503*b* faces right-side plate part 42*b* of inner holder 4 in the left-right direction (the Y direction).

(Front-Side Plate Part)

Front-side plate part 504 has a plate shape parallel to the YZ plane and covers accommodation space 5*c* from the front side (the + side in the X direction). Front-side plate part 504 includes a left end portion connected to a front end portion of left-side plate part 502*a*. Front-side plate part 504 includes a right end portion connected to a front end portion of right-side plate part 503*b*. Front-side plate part 504 includes a front-side surface that faces the rear-side surface of front-side wall part 314 in base main body 31 with a predetermined gap therebetween in the X direction.

(Rear-Side Plate Part)

Rear-side plate part 505 has a plate shape parallel to the YZ plane and covers accommodation space 5*c* from the rear side (the − side in the Y direction). Rear-side plate part 505 includes a left end portion connected to a rear end portion of left-side plate part 502*a* (the end portion thereof on the − side in the X direction). Rear-side plate part 505 includes a right end portion connected to a rear end portion of right-side plate part 503b. Rear-side plate part 505 is connected to a rear end portion (upper end portion) of inclined plate part 501.

(Lower-Side Plate Part)

Lower-side plate part 506 is a plate-like member and connects the front end portion (lower end portion) of inclined plate part 501 and a lower end portion of front-side plate part 504 in the X direction. Lower-side plate part 506 includes a rear end portion connected to the front end portion (lower end portion) of inclined plate part 501. Lower-side plate part 506 includes a front end portion connected to the lower end portion of front-side plate part 504.

(Front-Side Opening Part)

Front-side opening part 507 is provided at a position including a center portion of front-side plate part 504. Front-side opening part 507 is formed of a through-hole having a rectangular shape which penetrates front-side plate part 504 in the X direction (the front-rear direction). Front-side opening part 507 is provided so as to overlap front-side opening part 317 of base main body 31 in the X direction. Incident light bent by mirror MR passes through front-side opening part 507 and front-side opening part 317 and enters lens module 10.

(Left-Side Bearing Holding Part)

Left-side bearing holding part 508a is configured to hold left-side bearing 631a of sway support part 63 to be described later. Left-side bearing holding part 508a is provided in an inner surface of left-side plate part 502a (the side surface thereof on the − side in the Y direction). Specifically, left-side bearing holding part 508a is formed of a recessed portion provided in the inner surface of left-side plate part 502a. An outer ring of left-side bearing 631a is fixed to left-side bearing holding part 508a by a fixing means such as adhesion.

(Right-Side Bearing Holding Part)

Right-side bearing holding part 509b is configured to hold right-side bearing 632b of sway support part 63 to be described later. Right-side bearing holding part 509b is provided in an inner surface of right-side plate part 503b (the side surface thereof on the + side in the Y direction). Specifically, right-side bearing holding part 509b is formed of a recessed portion provided in the inner surface of right-side plate part 503b.

Right-side bearing holding part 509b faces left-side bearing holding part 508a in the Y direction. An outer ring of right-side bearing 632b is fixed to right-side bearing holding part 509b as such by a fixing means such as adhesion.

(Fixing Part)

Fixing part 514 is a portion to which ultrasonic motor 81 of drive unit 8 to be described later is fixed. Fixing part 514 is provided in a rear end portion of the upper surface of inclined plate part 501 (the end portion thereof on the − side in the X direction).

(Element Disposing Part)

Element disposing part 515 is a portion configured to dispose position detection element 82 of drive unit 8 therein. Element disposing part 515 is formed of a through-hole provided in left-side plate part 502a. This through-hole penetrates left-side plate part 502a in the Y direction. Element disposing part 515 faces magnet disposing part 47 of inner holder 4 in the Y direction.

(Sway Support Part)

Sway support part 63 corresponds to an example of the bearing part and is configured to support inner holder 4 with respect to outer holder 5 in a state in which inner holder 4 is swayable about first axis A1. Sway support part 63 includes left-side bearing 631a and right-side bearing 632b.

(Left-Side Bearing)

Left-side bearing 631a is configured to rotatably support a left end portion of inner holder 4 (the end portion thereof on the + side in the Y direction) with respect to outer holder 5. Left-side bearing 631a is a so-called radial bearing. The center axis of left-side bearing 631a coincides with first axis A1.

Left-side bearing 631a includes: an inner ring including an inner ring raceway in an outer peripheral surface of the inner ring; an outer ring including an outer ring raceway in an inner peripheral surface of the outer ring; and a plurality of rolling elements (for example, balls) rollably provided between the inner ring raceway and the outer ring raceway. Each rolling element may be held by a holder. The inner ring of left-side bearing 631a is fixed to left-side shaft part 44a of inner holder 4 by, for example, tight fit. The outer ring of left-side bearing 631a is fixed to left-side bearing holding part 508a of outer holder 5.

(Right-Side Bearing)

Right-side bearing 632b is configured to rotatably support a right end portion of inner holder 4 (the end portion thereof on the − side in the Y direction) with respect to outer holder 5. Right-side bearing 632b is a so-called radial bearing. The center axis of right-side bearing 632b coincides with first axis A1.

Right-side bearing 632b includes: an inner ring including an inner ring raceway in an outer peripheral surface of the inner ring; an outer ring including an outer ring raceway in an inner peripheral surface of the outer ring; and a plurality of rolling elements (for example, balls) rollably provided between the inner ring raceway and the outer ring raceway. Each rolling element may be held by a holder. The inner ring of right-side bearing 632b is fixed to right-side shaft part 45b of inner holder 4 by, for example, tight fit. The outer ring of right-side bearing 632b is fixed to right-side bearing holding part 509b of outer holder 5.

In the case of the present embodiment, inner holder 4 is supported by the radial bearings with respect to outer holder 5, and thus, it is possible to suppress inclination of the sway center of inner holder 4 with respect to first axis A1. As a result, inner holder 4 can sway with high accuracy.

(Drive Unit)

Drive unit 8 is a drive unit configured to sway inner holder 4 about first axis A1 with respect to outer holder 5. Drive unit 8 is provided between inner holder 4 and outer holder 5. Drive unit 8 is provided so as to be along the lower surface of mount part 41 in inner holder 4 and the upper surface of inclined plate part 501 in outer holder 5. Such a disposition aspect of drive unit 8 contributes to a reduction in the size of optical path bending module 2.

Figure 10:
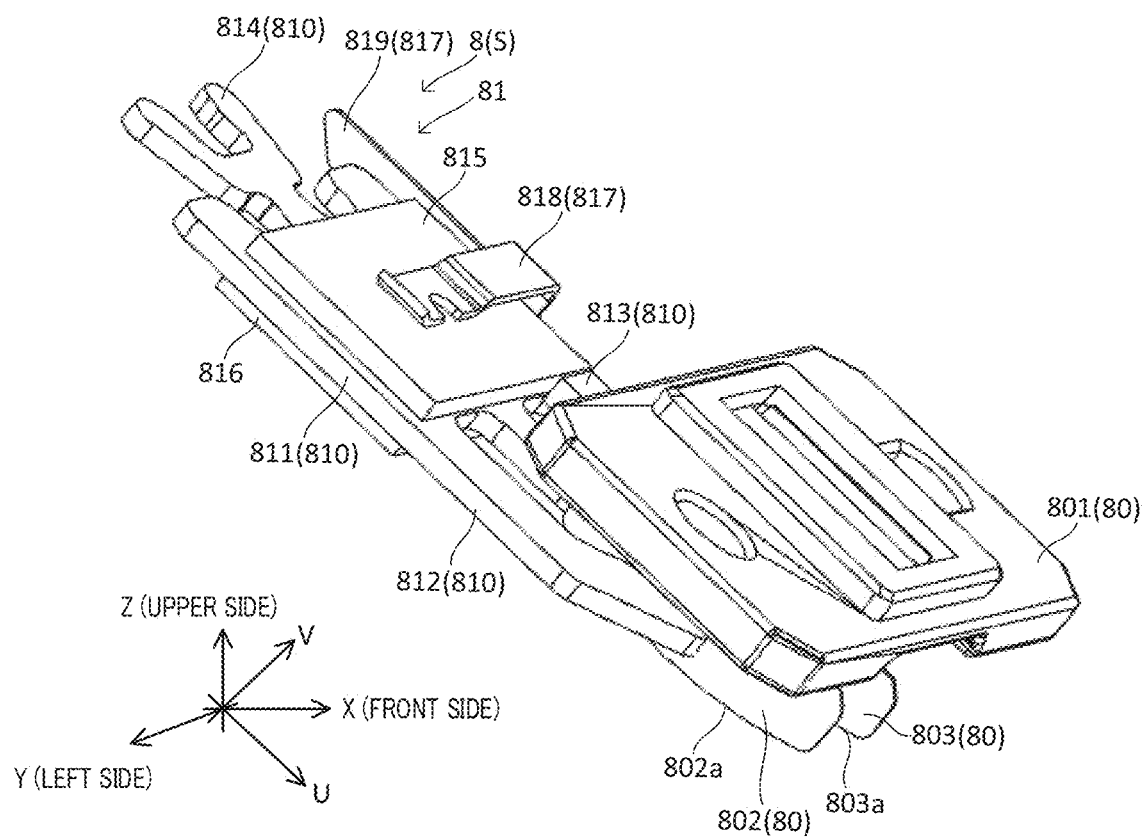
FIG. 10 is a perspective view of a drive unit.

Drive unit 8 as such includes interposition part 80, ultrasonic motor 81, position detection element 82 (see FIG. 8), and magnet 83 (see FIG. 5) as illustrated in FIG. 10.

(Interposition Part)

Interposition part 80 includes holder 801 and a pair of contact parts 802 and 803. Holder 801 is a member which is made of, for example, metal, ceramic, or synthetic resin and to which the pair of contact parts 802 and 803 is fixed. In the case of the present embodiment, holder 801 is a cuboid. Nonetheless, the shape of holder 801 is not limited to that in the case of the present embodiment. Holder 801 is fixed to inner fixing part 46 of inner holder 4 by a fixing means such as adhesion.

Each of the pair of contact parts 802 and 803 has, for example, a plate shape made of metal. In the case of the present embodiment, contact part 802 of the pair of contact parts 802 and 803 has, as a shape thereof viewed in the Y direction, a fan shape partially including arc part 802a, and contact part 803 of the pair of contact parts 802 and 803 has, as a shape thereof viewed in the Y direction, a fan shape partially including arc part 803a.

Note that, in the present embodiment, the fan shape means at least a shape with an arc-shaped appearance centered on a predetermined center point. In the case of the present embodiment, the predetermined center point is present on first axis A1. That is, arc parts 802a and 803a are each formed of an arc centered on the predetermined center point present on first axis A1. The predetermined center point, however, may be deviated from first axis A1.

When inner holder 4 sways about first axis A1, each of arc parts 802a and 803a of the pair of contact parts 802 and 803 moves along an arc around first axis A1. Such a configuration makes it possible to stably bring the pair of contact parts 802 and 803 into contact with transducers 812 and 813 of resonance part 810 in the entire sway stroke range of inner holder 4 while reducing the size of the pair of contact parts 802 and 803.

The pair of contact parts 802 and 803 is fixed to holder 801 at each upper end portion of the pair of contact parts 802 and 803 (each end portion thereof on the + side in the Z direction). Contact parts 802 and 803 are provided adjacent to each other in the Y direction. Contact part 802 is provided on the left side of contact part 803 (on the + side thereof in the Y direction).

The pair of contact parts 802 and 803 as such is portions with which transducers 812 and 813 of ultrasonic motor 81 to be described later come into contact, respectively. Specifically, transducer 812 is in contact with a left-side surface of contact part 802 (the side surface thereof on the + side in the Y direction), and transducer 813 is in contact with a right-side surface of contact part 803 (the side surface thereof on the − side in the Y direction).

When interposition part 80 is configured as described above, thrust in a direction of a tangent to a circle around first axis A1 is applied from ultrasonic motor 81 (specifically, transducers 812 and 813) to interposition part 80 (specifically, the pair of contact parts 802 and 803). Then, inner holder 4 sways about first axis A1 based on the thrust.

Note that, in the case of the present embodiment, interposition part 80 includes the pair of contact parts 802 and 803. Nonetheless, the number of contact parts included in interposition part 80 is not particularly limited. For example, interposition part 80 may include only one contact part of the pair of contact parts 802 and 803 (that is, a contact part). In this case, the position of the contact part may be adjusted as appropriate.

(Ultrasonic Motor)

Ultrasonic motor 81 is a driving source that generates a driving force for swaying inner holder 4 about first axis A1. Ultrasonic motor 81 is fixed to fixing part 514 in outer holder 5. Ultrasonic motor 81 is disposed so as to be along the upper surface of inclined plate part 501.

Hereinafter, in the description of ultrasonic motor 81, a direction of an intersection line between the upper surface of inclined plate part 501 and a plane parallel to the XZ plane will be referred to as the U direction (see FIG. 9). The + side in the U direction is a direction from the rear end portion of inclined plate part 501 (the end portion thereof on the − side in the X direction) to the front end portion thereof (the end portion thereof on the + side in the X direction). The − side in the U direction is a direction from the front end portion of inclined plate part 501 (the end portion thereof on the + side in the X direction) to the rear end portion thereof (the end portion thereof on the − side in the X direction). Note that, the U direction is also a direction of a tangent to a circle around first axis A1.

Figure 9:
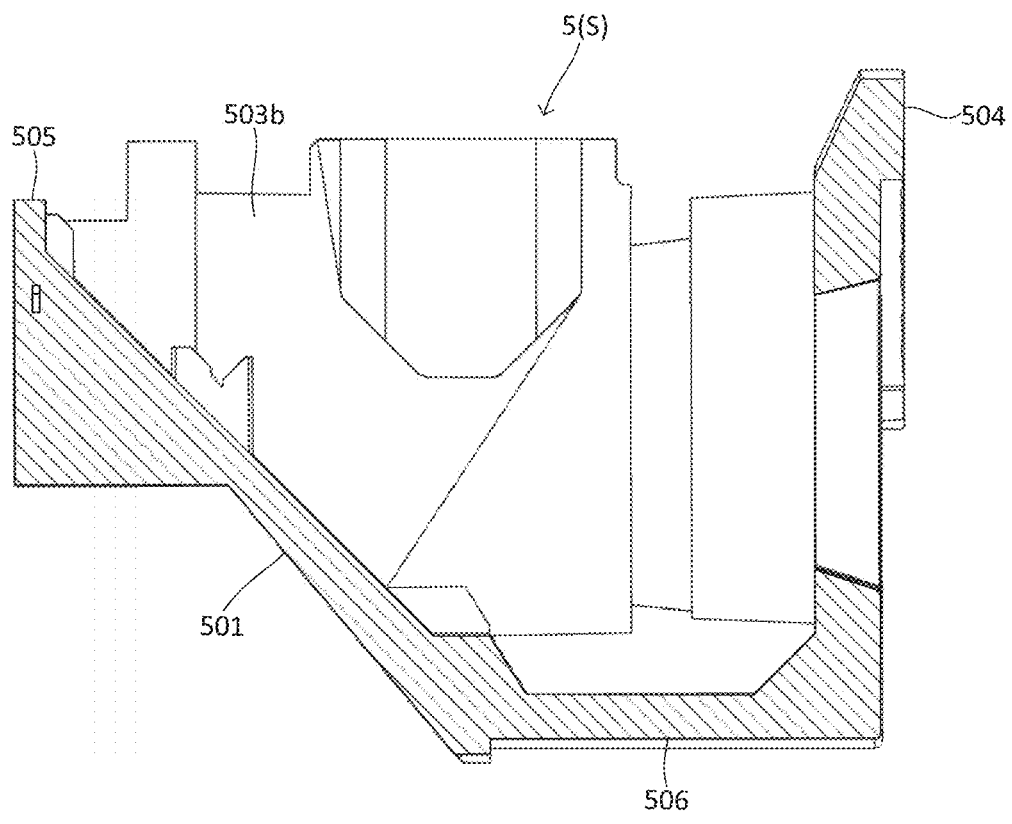
FIG. 9 is a cross-sectional view of the outer holder.

Further, a direction of a normal to the upper surface of inclined plate part 501 will be referred to as the V direction (see FIG. 9). The + side in the V direction is a direction from a lower-side surface of inclined plate part 501 (the side surface thereof on the − side in the Z direction) to an upper-side surface thereof (the side surface thereof on the + side in the Z direction). The − side in the V direction is a direction from the upper-side surface of inclined plate part 501 (the side surface thereof on the + side in the Z direction) to the rear end portion thereof (the side surface thereof on the + side in the Z direction).

Ultrasonic motor 81 includes resonance part 810, a pair of piezoelectric elements 815 and 816, and first electrode 817.

(Resonance Part)

Resonance part 810 is formed of, for example, a conductive material and resonates with vibration of the pair of piezoelectric elements 815 and 816 to convert vibrational motion into linear motion in a predetermined direction (the U direction in the present embodiment). Resonance part 810 is disposed so as to be along the U direction (in other words, a tangent to a circle around first axis A1).

When resonance part 810 vibrates based on the vibration of the pair of piezoelectric elements 815 and 816, a driving force in the U direction (the + side in the U direction or the − side in the U direction) acts on interposition part 80 (specifically, the pair of contact parts 802 and 803) from resonance part 810. Interposition part 80 then sways about first axis A1. As a result, inner holder 4 to which interposition part 80 is fixed sways about first axis A1.

Resonance part 810 has at least two resonance frequencies (a first resonance frequency and a second resonance frequency) and is deformed with different behaviors with respect to the resonance frequencies, respectively. In other words, the entire shape of resonance part 810 is set such that resonance part 810 is deformed with different behaviors with respect to the two resonance frequencies.

The different behaviors are a behavior that gives a force towards one direction in the U direction (for example, the + side in the U direction) with respect to interposition part 80 and a behavior that gives a force towards the other direction in the U direction (for example, the − side in the U direction) with respect to interposition part 80. In other words, the different behaviors are a behavior that sways inner holder 4 in the first direction about first axis A1 and a behavior that sways inner holder 4 in the second direction about first axis A1.

Resonance part 810 as such includes trunk part 811, a pair of transducers 812 and 813, and energization part 814.

Trunk part 811 has a substantially rectangular plate shape.

The pair of transducers 812 and 813 corresponds to examples of a first transducer and a second transducer and extends forward (to the + side in the U direction) from a front end portion of trunk part 811. In the case of the present embodiment, each of the pair of transducers 812 and 813 has a plate shape and is formed integrally with trunk part 811.

The pair of transducers 812 and 813 has a symmetrical shape with respect to a plane parallel to the UV plane (the XZ plane). Transducers 812 and 813 are adjacent to each other with a predetermined gap therebetween in the Y direction. Transducer 812 is provided on the left side of transducer 813 (on the + side thereof in the Y direction).

The pair of transducers 812 and 813 each includes a base end portion connected to the front end portion of trunk part 811 (the end portion thereof on the + side in the U direction). The pair of transducers 812 and 813 each includes a leading end portion as a free end. The leading end portion of transducer 812 is in contact with the left-side surface of contact part 802. The leading end portion of transducer 813 in in contact with the right-side surface of contact part 803. Note that, in case where interposition part 80 includes only one contact part of the pair of contact parts 802 and 803 (that is, a contact part), the leading end portion of transducer 812 may be in contact with a left-side surface of the one contact part and the leading end portion of transducer 813 may be in contact with a right-side surface of the one contact part.

In the case of the present embodiment, resonance part 810 includes the pair of transducers 812 and 813. Nonetheless, the number of transducers included in resonance part 810 is not particularly limited. For example, resonance part 810 may include only one transducer of the pair of transducers 812 and 813 (that is, a transducer). In this case, the position of the transducer may be adjusted as appropriate.

Energization part 814 extends from a rear end portion of trunk part 811 (the end portion thereof on the − side in the U direction) to the − side in the U direction. Energization part 814 is fixed to fixing part 514 in outer holder 5 by a fixing means such as adhesion. Further, energization part 814 is connected to a predetermined terminal of right-side power supply terminal part 93 of power supply part 9 to be described later through a right-side connection part (not illustrated). Among end portions of a power supply path thereof, an end portion connected to energization part 814 forms a second electrode (not illustrated) of ultrasonic motor 81.

(Piezoelectric Element)

Each the pair of piezoelectric elements 815 and 816 is, for example, a plate-shaped vibration element made of ceramic. Each of the pair of piezoelectric elements 815 and 816 vibrates when a high-frequency voltage is applied thereto. The pair of piezoelectric elements 815 and 816 is provided so as to be adjacent to each other in the V direction. Piezoelectric element 815 is located upward (on the + side in the V direction) from piezoelectric element 816.

The pair of piezoelectric elements 815 and 816 sandwiches trunk part 811 of resonance part 810 in the V direction. Accordingly, the pair of piezoelectric elements 815 and 816 and resonance part 810 (trunk part 811) are electrically connected to each other.

(First Electrode)

First electrode 817 includes sandwiching part 818 that sandwiches the pair of piezoelectric elements 815 and 816 in the V direction. The pair of piezoelectric elements 815 and 816 and first electrode 817 (sandwiching part 818) are electrically connected to each other. Accordingly, the pair of piezoelectric elements 815 and 816, resonance part 810, and first electrode 817 are electrically connected to each other.

Further, first electrode 817 includes electrode part 819 to which a voltage is applied. Electrode part 819 is electrically connected to a terminal of right-side power supply terminal part 93 of power supply part 9 to be described later through the right-side connection part (not illustrated). When a voltage is applied to electrode part 819, first electrode 817 as such applies a voltage to the pair of piezoelectric elements 815 and 816 through sandwiching part 818.

(Position Detection Element and Magnet)

Position detection element 82 is disposed in element disposing part 515 of outer holder 5. Position detection element 82 is connected to a power supply terminal that forms power supply part 9 to be described later.

Further, magnet 83 is a cuboid. Magnet 83 as such is magnetized in the Z direction. Magnet 83 is fixed to magnet disposing part 47 of inner holder 4.

Position detection element 82 is provided on the + side of magnet 83 in the Y direction. Position detection element 82 faces magnet 83 with a predetermined gap therebetween in the Y direction. Position detection element 82 detects the magnetic flux (also referred to as position information) of magnet 83 and transmits a detection value to control unit 13 implemented in sensor board 12.

Specifically, in the case of the present embodiment, position detection element 82 detects a change in the magnetic flux passing through a detection surface of position detection element 82 in the Y direction. The dispositions of magnet 83 and position detection element 82 are set such that the magnetic flux passing through position detection element 82 in the Y direction becomes zero in a state in which inner holder 4 does not sway (this state will also be referred to as the reference state of the inner holder). When inner holder 4 sways about first axis A1 from the reference state, the magnetic flux passing through position detection element 82 in the X direction changes.

Control unit 13 (see FIG. 1) determines the location of magnet 83 (that is, inner holder 4) around first axis A1 based on the detection value received from position detection element 82.

(Regarding Operation of Drive Unit)

In the case of drive unit 8 having the configuration as described above, the pair of piezoelectric elements 815 and 816 vibrates when a voltage is applied to ultrasonic motor 81 through power supply part 9 to be described later under the control of control unit 13. In a case where the frequency of the vibration generated by the pair of piezoelectric elements 815 and 816 corresponds to the first resonance frequency set to resonance part 810, resonance part 810 gives a force towards one direction in the U direction (for example, the + side in the U direction) to interposition part 80. As a result, inner holder 4 sways in the first direction about first axis A1 with respect to outer holder 5.

In a case where the frequency of the vibration generated by the pair of piezoelectric elements 815 and 816 corresponds to the second resonance frequency set to resonance part 810, on the other hand, resonance part 810 gives a force towards the other direction in the U direction (for example, the − side in the U direction) to interposition part 80. As a result, inner holder 4 sways in the second direction about first axis A1 with respect to outer holder 5.

(Power Supply Part)

Power supply part 9 will be described with reference to FIGS. 2 to 4. Power supply part 9 is configured to supply power (apply a voltage) to drive unit 8. Specifically, power supply part 9 supplies power to position detection element 82 of drive unit 8 and to ultrasonic motor 81 of drive unit 8.

Power supply part 9 as such includes FPC 90, left-side power supply terminal part 92, right-side power supply terminal part 93, a left-side connection part (not illustrated), and the right-side connection part (not illustrated).

(FPC)

FPC 90 is a flexible printed circuit board and is connected to a power supply (not illustrated) of a camera-mounted device (hereinafter, this power supply will be simply referred to as "power supply"). FPC 90 has a substantially rectangular plate shape.

FPC 90 as such includes outer terminal part 901, inner first terminal part 902, and inner second terminal part 903.

(Outer Terminal Part)

Outer terminal part 901 is provided in a left end portion of FPC 90. In the case of the present embodiment, outer terminal part 901 includes a plurality of terminals. These respective terminals are connected to the power supply and are also connected to ultrasonic motor 81 and position detection element 82.

(Inner First Terminal Part)

Inner first terminal part 902 is provided in a left end portion of a front end portion of FPC 90. In the case of the present embodiment, inner first terminal part 902 includes a plurality of terminals. These respective terminals are connected to outer terminal part 901 by wiring (not illustrated) provided in FPC 90. Inner first terminal part 902 is terminals configured to supply power to position detection element 82.

(Inner Second Terminal Part)

Inner second terminal part 903 is provided in a right end portion of the front end portion of FPC 90. In the case of the present embodiment, inner second terminal part 903 includes a plurality of terminals. These respective terminals are connected to, for example, outer terminal part 901 by wiring (not illustrated) provided in FPC 90. Inner second terminal part 903 is terminals configured to supply power to ultrasonic motor 81.

(Left-Side Power Supply Terminal Part)

Left-side power supply terminal part 92 forms a portion of a conductive path connecting inner first terminal part 902 of FPC 90 and position detection element 82. Left-side power supply terminal part 92 is fixed to a left end portion of the rear-side surface of front-side wall part 314 (the end portion thereof on the + side in the Y direction) by a fixing means such as adhesion. Left-side power supply terminal part 92 supplies power to position detection element 82 through the left-side connection part that is not illustrated.

(Right-Side Power Supply Terminal Part)

Right-side power supply terminal part 93 forms a portion of a conductive path connecting inner second terminal part 903 of FPC 90 and ultrasonic motor 81. Right-side power supply terminal part 93 is fixed to a right end portion of the rear-side surface of front-side wall part 314 (the end portion thereof on the + side in the Y direction) by a fixing means such as adhesion. Right-side power supply terminal part 93 supplies power to ultrasonic motor 81 through the right-side connection part that is not illustrated.

[Lens Module]

Lens module 10 is located on the + side of optical path bending module 2 in the X direction. Light from a subject enters mirror MR of optical path bending module 2 from the + side in the Z direction as indicated by long dashed short dashed line α (also referred to as the first optical axis) in FIG. 1.

The light that has entered mirror MR is bent at the optical path bending surface of mirror MR as indicated by long dashed short dashed line β (also referred to as the second optical axis) in FIG. 1 and is guided to lens part 102 of lens module 10 disposed at a stage subsequent to mirror MR (that is, on the + side thereof in the X direction).

Lens module 10 includes cover 101, a base (not illustrated), lens part 102, and an AF device (not illustrated). Cover 101 may be integral with or separate from the cover (base main body 31 in the case of the present embodiment) of optical path bending module 2.

Lens part 102 is disposed in an accommodation space between the cover and the base in a state in which lens part 102 is held by a lens guide (not illustrated). Lens part 102 includes lens barrel 103 and one or more lenses 104 held by lens barrel 103. Lens part 102 is supported by the base through the lens guide so as to be displaceable in the X direction.

The AF device is a drive unit and displaces lens part 102 in the X direction for the purpose of auto-focusing. Note that, the structure of the AF device is not particularly limited. For example, the AF device may be such an AF device that moves lens part 102 in the X direction with a motor (not illustrated) and by converting rotational motion of the motor into linear motion in the X direction by means of a conversion mechanism.

[Image-Capturing Element Module]

Image-capturing element module 11 is disposed on the + side of lens part 102 in the X direction. Image-capturing element module 11 includes, for example, an image-capturing element such as a charge-coupled device (CCD) image sensor and a complementary metal oxide semiconductor (CMOS) image sensor. The image-capturing element of image-capturing element module 11 captures a subject image formed by lens part 102 and outputs an electrical signal corresponding to the subject image. Sensor board 12 is electrically connected to image-capturing element module 11, and power is supplied to image-capturing element module 11 through sensor board 12 and the electrical signal of the subject image captured by image-capturing element module 11 is outputted through sensor board 12. For image-capturing element module 11 as such, a conventionally known structure can be employed.

Operation and Effect of Present Embodiment

According to the present embodiment having the configuration as described above, it is possible to provide an optical actuator, a camera module, and a camera-mounted device each having a novel configuration.

Additional Notes

Figure 12A:
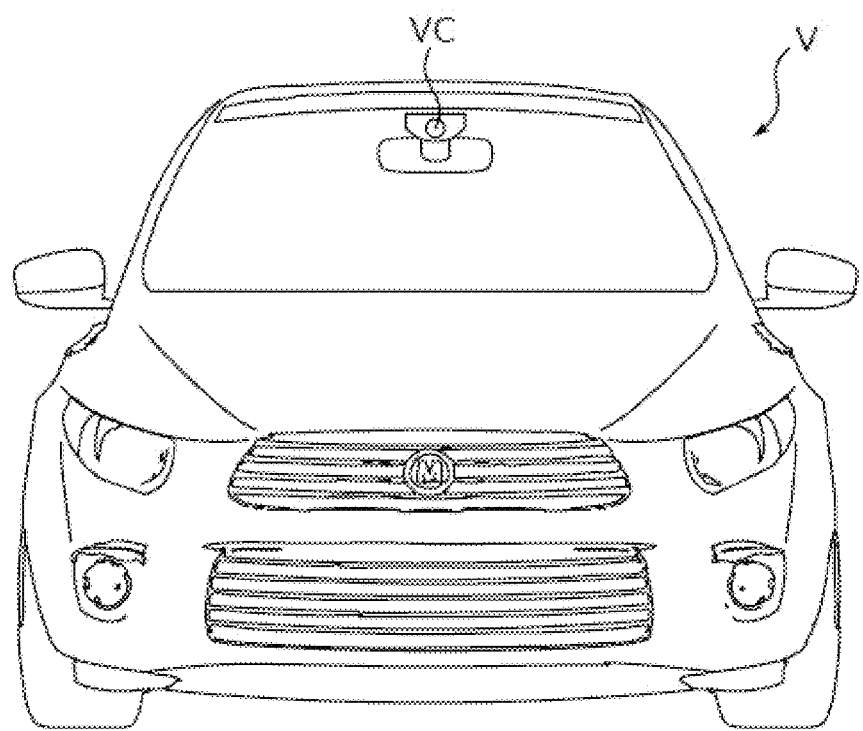
FIG. 12A illustrates an automobile as the camera-mounted device in which an in-vehicle camera module is mounted.
Figure 12B:
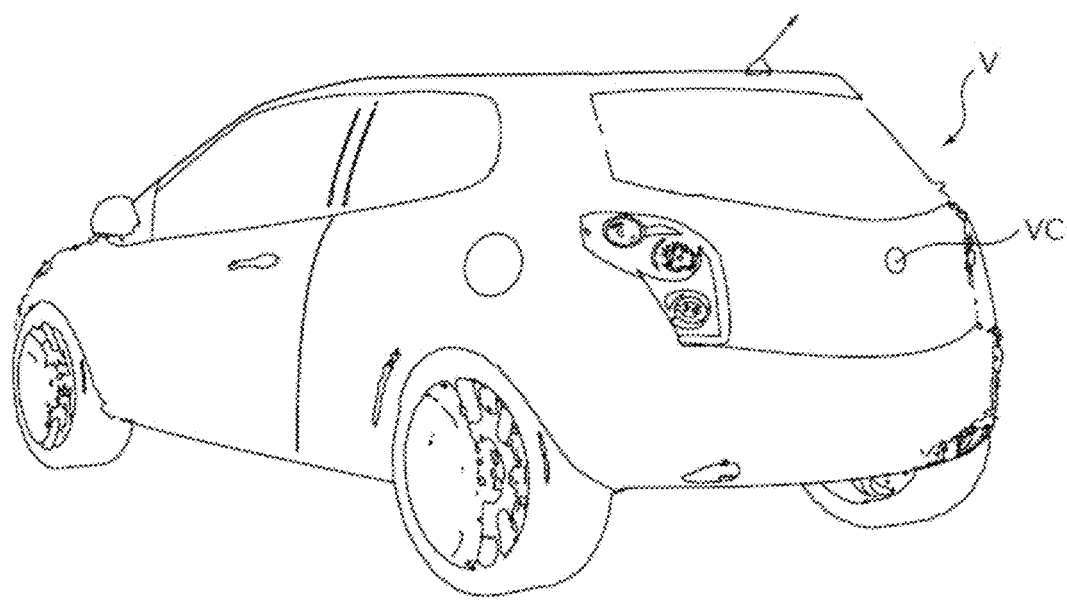
FIG. 12B illustrates the automobile as the camera-mounted device in which the in-vehicle camera module is mounted.

FIGS. 12A and 12B illustrate automobile V as a camera-mounted device in which in-vehicle camera module vehicle camera (VC) is mounted. FIG. 12A is a front view of automobile V, and FIG. 12B is a rear perspective view of automobile V. In automobile V, camera module C described in the embodiment is mounted as in-vehicle camera module VC. As illustrated in FIGS. 12A and 12B, in-vehicle camera module VC is attached to the windshield so as to face the front side, or is attached to the rear gate so as to face the rear side, for example. This in-vehicle camera module VC is used for a rear-view monitor, a dashboard camera, collision-prevention control, automated driving control, or the like.

Further, an optical actuator according to the present invention includes, as a basic configuration, an inner holder capable of holding an optical path bending member; an outer holder configured to support the inner holder in a swayable manner about a first axis; and a drive unit configured to sway the inner holder (hereinafter referred to as "the basic configuration").

Further, the optical actuator according to the present invention may have, in addition to the basic configuration described above, a configuration in which the inner holder is rotatably supported through a bearing part with respect to the outer holder at both end portions of the inner holder in a first direction parallel to the first axis (hereinafter referred to as "additional configuration 1").

Further, the optical actuator according to the present invention may have, in addition to the basic configuration described above, a configuration in which the drive unit includes an ultrasonic motor, which is supported by the outer holder, and an interposition part, which is supported by the inner holder, the ultrasonic motor includes a transducer configured to resonate, and the interposition part includes a contact part configured to come into contact with the transducer and having a fan shape (hereinafter referred to as "additional configuration 2").

Further, the optical actuator according to the present invention may have, in addition to the basic configuration described above, a configuration in which the bearing part includes: an inner ring including an inner ring raceway in an outer peripheral surface of the inner ring; an outer ring including an outer ring raceway in an inner peripheral surface of the outer ring; and a plurality of rolling elements rollably provided between the inner ring and the outer ring (hereinafter referred to as "additional configuration 3").

Note that, the present invention may include, in addition to the basic configuration described above, at least one configuration of additional configurations 1 to 3 described above. Further, the present invention may include, in addition to the basic configuration described above, a configuration in which additional configuration 1 to 3 are appropriately combined.

The disclosure of U.S. Provisional Application No. 63/119,001, filed on Nov. 30, 2020, including the specification, drawings and abstract, is incorporated herein by reference in its entirety.

INDUSTRIAL APPLICABILITY

An optical actuator and a camera module according to the present invention can be mounted in, for example, a thin camera-mounted device such as a smartphone, a mobile phone, a digital camera, a notebook computer, a tablet terminal, a portable game machine, and an in-vehicle camera, for example.

REFERENCE SIGNS LIST

C Camera module
2 Optical path bending module
3 Base
31 Base main body
311 Lower-side wall part
312a Left-side wall part
313b Right-side wall part
314 Front-side wall part
315 Upper-side wall part
316 Upper-side opening part
317 Front-side opening part
318 Rear-side opening part
321 Lower-side opening part
36 Rear-side plate
MR Mirror
S Mirror swaying device
4 Inner holder
41 Mount part
41a Left-side plate part
42b Right-side plate part
43 Rear-side plate part
44a Left-side shaft part
45b Right-side shaft part
46 Inner fixing part
47 Magnet disposing part
5 Outer holder
5c Accommodation space
501 Inclined plate part
502a Left-side plate part
503b Right-side plate part
504 Front-side plate part
505 Rear-side plate part
506 Lower-side plate part
507 Front-side opening part
508a Left-side bearing holding part
509b Right-side bearing holding part
514 Fixing part
515 Element disposing part
63 Sway support part
631a Left-side bearing
632b Right-side bearing
8 Drive unit
80 Interposition part
801 Holder
802, 803 Contact part
802a, 803a Arc part
81 Ultrasonic motor
810 Resonance part
811 Trunk part
812, 813 Transducer
814 Energization part
815, 816 Piezoelectric element
817 First electrode
818 Sandwiching part
819 Electrode part
82 Position detection element
83 Magnet
9 Power supply part
90 FPC
901 Outer terminal part
902 Inner first terminal part
903 Inner second terminal part
92 Left-side power supply terminal part
93 Right-side power supply terminal part
10 Lens module
101 Cover
102 Lens part
103 Lens barrel
104 Lens
11 Image-capturing element module
12 Sensor board
13 Control unit
A1 First axis
V Automobile
VC In-vehicle camera module
M Smartphone

What is claimed is:
1. An optical actuator, comprising:
an inner holder comprising a plated-shaped mount part including an upper surface and a lower surface and capable of holding an optical path bending member on the upper surface, the optical path bending member being configured to make a light entering in a Z direction emit in an X direction;
an outer holder comprising:
a pair of side plate parts configured to support the inner holder in a swayable manner about a first axis extending in parallel to a Y direction; and
an inclined plate part provided between the pair of side plate parts in the Y direction and forming an accommodation space for the inner holder together with the pair of side plate parts; and a drive unit configured to sway the inner holder, wherein:

the inner holder is rotatably supported through a bearing part with respect to the pair of side plate parts of the outer holder at both end portions of the inner holder in the Y direction, the drive unit includes an ultrasonic motor and an interposition part, the ultrasonic motor being supported by the outer holder, the interposition part being supported by the inner holder, the upper surface and the lower surface of the plated-shaped mount part are disposed to extend to be in parallel to the Y direction and inclined with respect to the X direction and the Z direction, the inclined plate part includes an upper surface disposed to extend to be in parallel to the Y direction and inclined with respect to the X direction and the Z direction to face the lower surface of the plated-shaped mount part to form an inclined gap therebetween, the ultrasonic motor includes a resonator including a transducer configured to resonate, the resonator being a plate-shaped member disposed on the upper surface of the inclined plate part in the inclined gap, and the interposition part includes a contact part disposed the inclined gap and configured to come into contact with the transducer, the contact part having a fan shape.

2. The optical actuator according to claim 1, wherein:

the ultrasonic motor includes a pair of the transducers, and the interposition part includes a pair of the contact parts configured to respectively come into contact with the pair of transducers.

3. The optical actuator according to claim 1, wherein the contact part includes an arc part formed of an arc centered on a center point on the first axis.

4. The optical actuator according to claim 3, wherein:

the transducer is disposed so as to be along a tangent to a circle around the first axis, and when the transducer resonates, a driving force in a direction parallel to the tangent acts on the contact part from the transducer.

5. The optical actuator according to claim 1, wherein: the bearing part includes:

an inner ring including an inner ring raceway in an outer peripheral surface of the inner ring;

an outer ring including an outer ring raceway in an inner peripheral surface of the outer ring; and a plurality of rolling elements rollably provided between the inner ring and the outer ring.

6. A camera module, comprising:

the optical actuator according to claim 1;

the optical path bending member held by the inner holder of the optical actuator; and an image-capturing element disposed on a front side with respect to the optical actuator in the X direction.

7. A camera-equipped device, comprising:

the camera module according to claim 6; and a control unit configured to control the camera module.

* * * * *